UNITED STATES PATENT OFFICE.

HEINRICH THRON, OF FRANKFORT-ON-THE-MAIN, GERMANY, ASSIGNOR TO VEREINIGTE CHININFABRIKEN ZIMMER & CO., OF FRANKFORT-ON-THE-MAIN, GERMANY.

ANISIC-ACID ETHERS OF THE CINCHONA ALKALOIDS.

SPECIFICATION forming part of Letters Patent No. 695,591, dated March 18, 1902.

Application filed January 8, 1902. Serial No. 88,933. (Specimens.)

*To all whom it may concern:*

Be it known that I, HEINRICH THRON, a subject of the Emperor of Germany, and a resident of Frankfort-on-the-Main, Germany, have invented certain new and useful Improvements in Pharmaceutical Products, of which the following is a specification.

My invention relates to the production of hitherto unknown anisic-acid ethers of the cinchona alkaloids having, in case quinin is used, most probably the following formula:

$$C_6H_4OCH_3.COO.C_{20}H_{23}N_2O.$$

According to my researches these new compounds can be easily obtained by heating the alphylethers of anisic acid with the cinchona alkaloids. On using, for instance, the phenolether of anisic acid and quinin anisylquinin is obtained, which is tasteless and possesses great therapeutic value. The average dose employed for medicinal purposes is about two grams.

In carrying out my new process practically I can proceed as follows: 32.4 kilograms of anhydrous quinin are heated for a few hours with 22.8 kilograms or more of the phenolether of anisic acid to a temperature of 120° centigrade. The new anisylquinin is then formed according to the following equation:

$$C_{20}C_{24}N_2O_2+C_6H_4.OCH_3.COO.C_6H_5=$$
$$C_6H_4.OCH_3.C.OO.C_{20}H_{23}N_2O+C_6H_5OH.$$

The product of the reaction is dissolved in benzene. The benzene solution is treated with dilute alkali, which removes the phenol, and the new anisylquinin is then extracted from the benzene solution by dilute acid. By adding dilute ammonia to the acid solution and shaking with ether the anisylquinin is dissolved in the latter and crystallizes out in the shape of fine needles.

The new anisylquinin forms fine white needles, melting at 87° to 88° centigrade. It is tasteless, insoluble in water, readily soluble in alcohol, benzene, and chloroform.

The new anisylquinin still retains basic properties and forms salts with organic and inorganic acids. These salts are also of great value in medicine, as the therapeutic effect of the anisylquinin may be modified and reinforced by the proper selection of the acid with which the ether is combined. Thus the salicylate of anisylquinin will be very efficient in rheumatic affections, whereas the cinnamic-acid salt of the anisylquinin will be of great value in tuberculous affections.

Instead of the phenolether of anisic acid other alphylethers of anisic acid may be employed in the above process, and instead of the quinin other cinchona alkaloids, such as quinidin, may be used.

Having now described my invention and in what manner the same is to be performed, what I claim as new, and desire to secure by Letters Patent, is—

1. The herein-described new anisic-acid ethers of the cinchona alkaloids being insoluble in water, readily soluble in alchohol, benzene and chloroform, still possessing basic properties and forming with organic and inorganic acids well-characterized salts, substantially as hereinbefore described.

2. The herein-described new anisic-acid ether of quinin having most probably the formula:

$$C_6H_4.OCH_3COOC_{20}H_{23}N_2O$$

forming tasteless fine needles, melting at 87° to 88° centigrade insoluble in water, readily soluble in alcohol, benzene and chloroform, forming well-characterized salts with organic and inorganic acids, substantially as described herein.

In testimony whereof I have signed my name in the presence of two subscribing witnesses.

HEINRICH THRON.

Witnesses:
WILHELM EITEL,
THEOPHIL REGELMANN.